United States Patent
Ezaki et al.

(10) Patent No.: US 11,693,545 B2
(45) Date of Patent: Jul. 4, 2023

(54) DEVICE AND METHOD FOR ARRANGING OBJECTS DISPLAYED ON DIVIDED AREAS IN A VEHICLE DISPLAY

(71) Applicant: Faurecia Clarion Electronics Co., Ltd., Saitama (JP)

(72) Inventors: Jitsu Ezaki, Saitama (JP); Kazumi Hara, Saitama (JP)

(73) Assignee: Faurecia Clarion Electronics Co., Ltd., Saitama (JP)

( * ) Notice: Subject to any disclaimer, the term of this patent is extended or adjusted under 35 U.S.C. 154(b) by 0 days.

(21) Appl. No.: 17/785,580

(22) PCT Filed: Dec. 15, 2020

(86) PCT No.: PCT/JP2020/046798
§ 371 (c)(1),
(2) Date: Jun. 15, 2022

(87) PCT Pub. No.: WO2021/125180
PCT Pub. Date: Jun. 24, 2021

(65) Prior Publication Data
US 2023/0017397 A1   Jan. 19, 2023

(30) Foreign Application Priority Data
Dec. 18, 2019 (JP) .................................. 2019-228573

(51) Int. Cl.
G06F 3/04847 (2022.01)
G06F 3/04845 (2022.01)
G06F 3/04886 (2022.01)

(52) U.S. Cl.
CPC ...... *G06F 3/04845* (2013.01); *G06F 3/04847* (2013.01); *G06F 3/04886* (2013.01); *G06F 2203/04803* (2013.01)

(58) Field of Classification Search
None
See application file for complete search history.

(56) References Cited

U.S. PATENT DOCUMENTS 9,469,195 B1    10/2016  Boss et al.
2006/0259860 A1*  11/2006  Kobashi ............... G06F 40/106
                                               715/209

(Continued)

FOREIGN PATENT DOCUMENTS

EP    3396514 A1     10/2018
JP    2015-087861 A   5/2015

OTHER PUBLICATIONS

ORC Layout: Adaptive GUI Layout with OR-Constraints by Jiang et al. published in May 2019 (Year: 2019).*

*Primary Examiner* — Rinna Yi
(74) *Attorney, Agent, or Firm* — Volpe Koenig

(57) ABSTRACT

A display control device includes: a display region setting unit for changing a position of a boundary line of display regions provided on a screen to dynamically change a size of the display regions, in accordance with an event; a display control unit provides arrangement regions for arranging display objects in the display regions, and change a relative positional relationship of the arrangement regions on the same display region of the display regions, in accordance with change in size of the one or plurality of display regions; and a priority setting unit for setting relative priority regarding the arrangement regions, wherein where the relative positional relationship between the arrangement regions is changed, which causes the arrangement regions to be within a predetermined distance, the display control unit controls display of the display objects arranged on a same arrangement region based on the priority set regarding the arrangement regions.

12 Claims, 10 Drawing Sheets

(56) References Cited

U.S. PATENT DOCUMENTS

| | | | |
|---|---|---|---|
| 2016/0202852 A1* | 7/2016 | Park | G06F 3/04845 |
| | | | 715/781 |
| 2016/0239203 A1 | 8/2016 | Sato | |
| 2017/0115860 A1 | 4/2017 | Youn et al. | |
| 2017/0140504 A1* | 5/2017 | Jeong | G06F 1/1677 |
| 2019/0012078 A1 | 1/2019 | Ishiguro | |
| 2019/0121539 A1* | 4/2019 | Sato | G06F 3/04842 |
| 2019/0273910 A1* | 9/2019 | Malaika | G06F 3/011 |

* cited by examiner

Fig.6
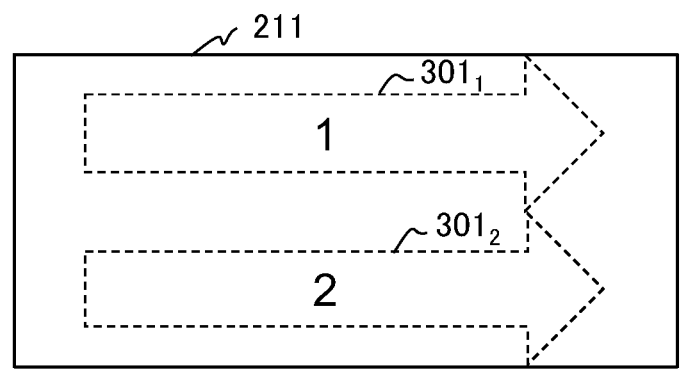
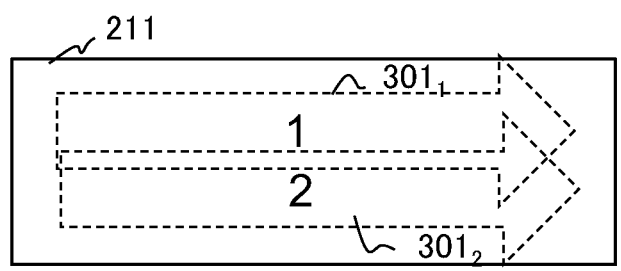

Fig.9
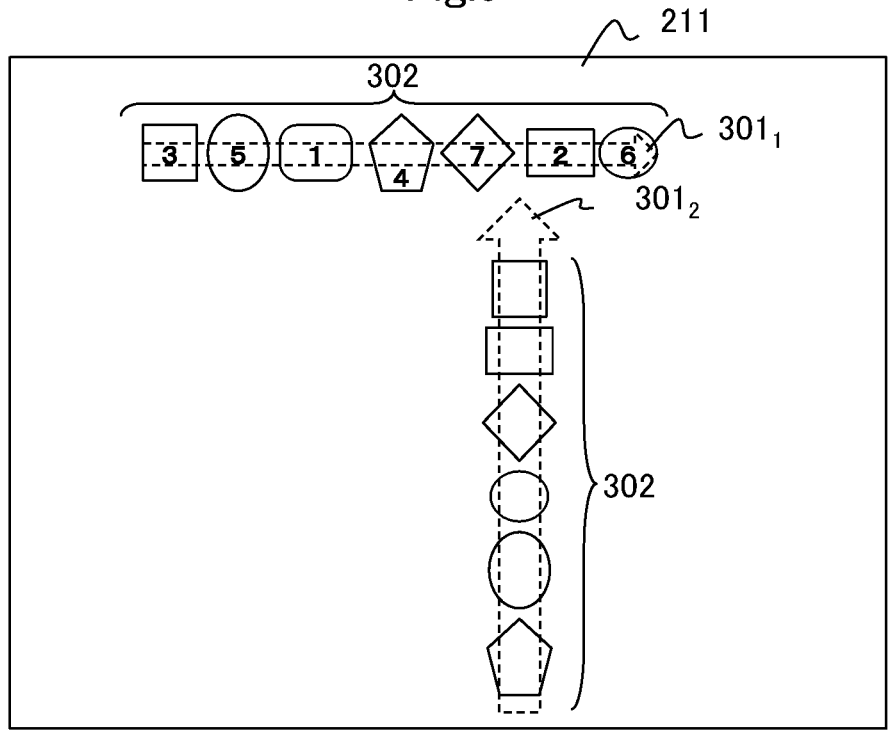
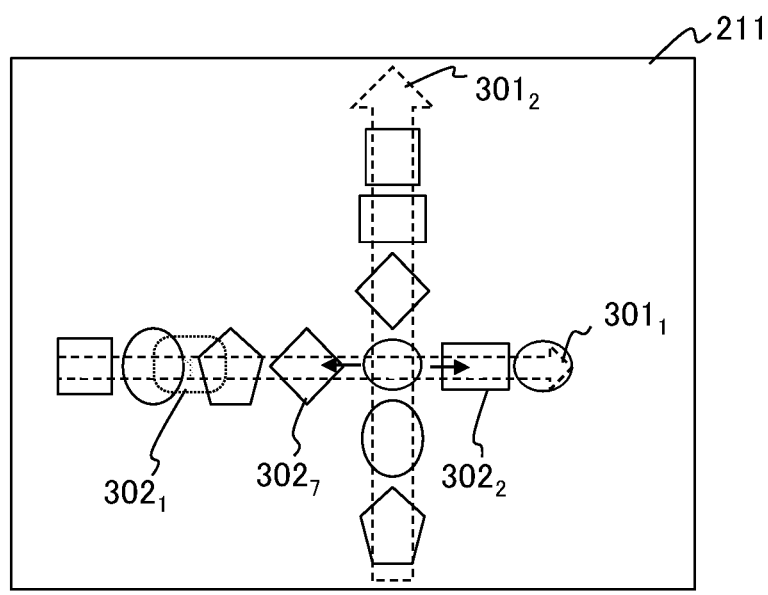

DEVICE AND METHOD FOR ARRANGING OBJECTS DISPLAYED ON DIVIDED AREAS IN A VEHICLE DISPLAY

CLAIM OF PRIORITY

This application claims the priority based on the Japanese Patent Application No. 2019-228573 filed on Dec. 18, 2019. The entire contents of which are incorporated herein by reference for all purpose.

TECHNICAL FIELD

The present invention relates to a display control device and a display control method.

BACKGROUND ART

As an invention relating to information display on a display, for example, PTL 1 discloses an electronic device including a display unit that performs display on a display region, an operation detection unit that detects an operation with respect to the display region, and a display control unit that controls the display unit. Further, PTL 1 describes that "the display control unit has a division display mode in which a first display region included in the display region is divided into a plurality of display regions and display of each of the plurality of display regions is independently controlled. In the division display mode, the display control unit causes the display unit to display one operation target image that enables setting for each of the plurality of display regions".

CITATION LIST

Patent Literature

PTL 1: JP 2015-87861 A

SUMMARY OF INVENTION

Technical Problem

As described in PTL 1, it has hitherto been possible to divide a display screen into a plurality of parts and independently control display of regions obtained through the division. Specifically, when a size of each region is changed, it is possible to simply downsize or upsize a display object such as an icon displayed on the region having a changed size, change a layout in a stepwise manner, perform trimming partially, or hide the display object. However, display change of the display object described above when the size of the region is changed is not sufficiently in conformity with dynamic change in size of the region. Thus, it is difficult to say that optimal display of the display object is provided.

The present invention has been made in view of such circumstances, and has an object to enable display of display objects to be changed more appropriately in conformity with dynamic change in size of a display region provided on a screen.

Solution to Problem

The present application includes a plurality of solutions to at least a part of the problems described above. One example of the solutions is as follows.

In order to solve the above-mentioned problem, a display control device according to one aspect of the present invention includes: a display region setting unit configured to change a position of a boundary line of one or a plurality of display regions provided on a screen to dynamically change a size of the one or plurality of display regions, in accordance with occurrence of an event; a display control unit configured to provide arrangement regions for arranging display objects in the one or plurality of display regions, and change a relative positional relationship of the arrangement regions provided on a same display region of the one or plurality of display regions, in accordance with change in size of the one or plurality of display regions; and a priority setting unit configured to set relative priority with respect to the arrangement regions provided on the same display region, wherein in a case where the relative positional relationship between the arrangement regions provided on the same display region is changed, which causes the arrangement regions to be close to each other at a predetermined distance or shorter, the display control unit controls display of the display objects arranged on a same arrangement region in an arrangement region unit, based on the priority set with respect to the arrangement regions.

Advantageous Effects of Invention

According to one aspect of the present invention, display of display objects can be changed more appropriately in conformity with dynamic change in size of a display region provided on a screen.

Note that problems, configurations, and effects other than those described above will become apparent in the following description of the embodiments.

BRIEF DESCRIPTION OF DRAWINGS

FIG. 3A is a diagram illustrating a first display example, FIG. 3B is a diagram illustrating a second display example, FIG. 3C is a diagram illustrating a third display example, and FIG. 3D is a diagram illustrating a fourth display example.

FIG. 6 is a diagram for describing an overview of change in setting of the arrangement region in conformity with change in size of the display region.

FIG. 9 is a diagram for describing an example of moving display objects arranged on an arrangement region with lower priority.

DESCRIPTION OF EMBODIMENTS

With reference to the drawings, an embodiment of the present invention is described below. Note that, in all the drawings for describing the embodiment, in principle, the identical members are denoted with the identical reference symbols, and repeated description therefor is omitted as appropriate. In the following embodiment, it goes without saying that constituent elements therein (including element steps and the like) are not necessarily essential unless otherwise particularly stated or incontrovertibly considered as essentials in principle. When the expressions "constituted of A", "being formed of A", "including A", and "comprising A" are given, it goes without saying that the expressions are not intended to exclude elements other than A unless A otherwise is clearly stated as the only element. Similarly, in the following embodiment, when shapes, positional relationships, and the like of the constituent elements and the like are referred to, substantially approximate or similar shapes and the like are included unless otherwise particularly stated or incontrovertibly considered to be different in principle or the like.

Configuration Example of Onboard Device 10 According to One Embodiment of Present Invention The onboard device 10 according to one embodiment of the present invention is described below. The onboard device 10 corresponds to a display control device according to the present invention.

Figure 1:
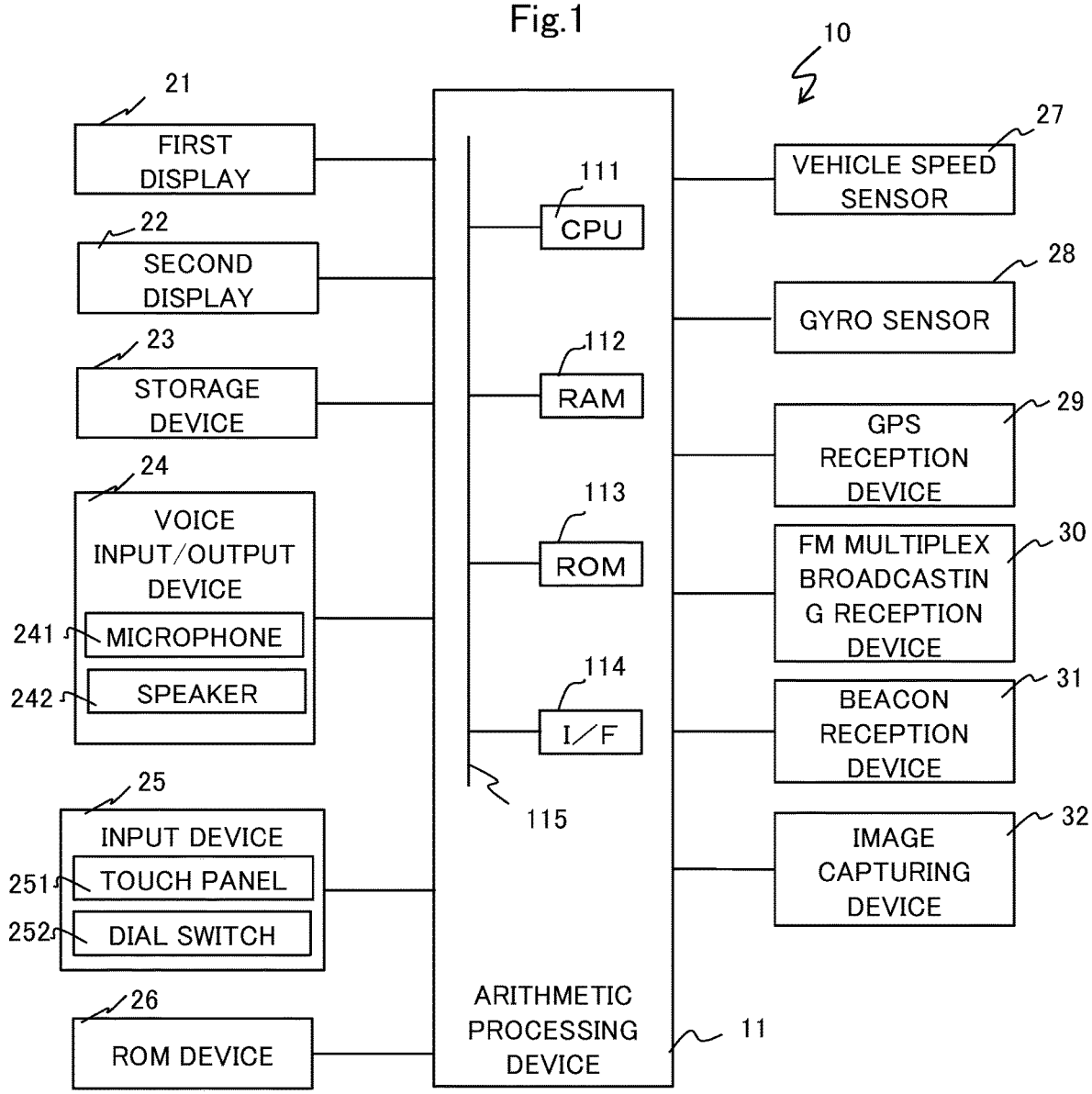
FIG. 1 is a block diagram illustrating a configuration example of an onboard device according to one embodiment of the present invention.

FIG. 1 illustrates a configuration example of the onboard device 10 according to one embodiment of the present invention. The onboard device 10 can be implemented with an onboard navigation device having a navigation function, for example. Thus, the onboard device 10 is, for example, a box-like device including a first display 21 on a front surface, and is housed in a console panel inside a vehicle. The onboard device 10 may include a mounting tool (bracket) to be mounted to the console panel, and may be mounted, for example, above the console panel inside the vehicle through intermediation of the mounting tool.

Here, the navigation function refers to a function that a navigation device usually has such as displaying map information, searching for a recommended route, and navigating from a departure place (or a current place) to a target place, and displaying traffic information. Note that the onboard device 10 is not limited to a dedicated navigation device, and may be, for example, a smartphone, a tablet terminal device, and a personal data assistance (PDA). In this case, the navigation function is provided by an application program installed in those devices or a server device to which those devices can connect.

The onboard device 10 can display, in addition to a navigation screen relevant to the navigation function, an air-conditioning screen for setting a temperature, an air flow rate, and the like of an air-conditioner, an audio video (AV) screen for selecting and reproducing audio or a video to be reproduced and for setting a sound volume, image quality, and the like, a screen for an application (a mailer, social network service (SNS), and the like) executed by a smartphone that is wirelessly connected, a telephone screen for outgoing and incoming calls, a camera screen for displaying an image captured by an onboard camera, and the like.

The onboard device 10 includes an arithmetic processing device 11, the first display 21, a second display 22, a storage device 23, a voice input/output device 24, an input device 25, and a read only memory (ROM) device 26.

The onboard device 10 further includes a vehicle speed sensor 27, a gyro sensor 28, a global position system (GPS) reception device 29, a frequency modulation (FM) multiplex broadcasting reception device 30, and a beacon reception device 31.

The arithmetic processing device 11 is a central unit that performs various types of processing of the onboard device 10. The arithmetic processing device 11 detects a current place through use of information output from various sensors such as the vehicle speed sensor 27, and the GPS reception device 29, for example. Based on the acquired current place information, the arithmetic processing device 11 reads map information required for display from the storage device 23 and the ROM device 26. The arithmetic processing device 11 develops the read map information into graphics and overlaps a mark indicating the current place thereon, to generate and output an image signal to be displayed on the first display 21. The arithmetic processing device 11 further calculates a recommended route connecting a departure place (current place) and a target place that are instructed from a user (a driver or a passenger), through use of map information and the like stored in the storage device 23 or the ROM device 26. The arithmetic processing device 11 navigates along the route by outputting a predetermined signal to a speaker 242 and the first display 21.

The arithmetic processing device 11 can set one or a plurality of display regions on a display screen of the first display 21, and can change sizes of the display regions in accordance with an operation from a user or occurrence of a predetermined event. The arithmetic processing device 11 displays a predetermined display object in a predetermined display form (icon and the like) independently in each display region. Moreover, the arithmetic processing device 11 can also display contents in an arbitrary display region(s) among one or a plurality of display regions, which are set in the first display 21, on the second display 22.

The arithmetic processing device 11 as described above includes a central processing unit (CPU) 111 that executes various types of processing for performing arithmetic operations and controlling the devices, a random access memory (RAM) 112 that temporarily stores map information, arithmetic data, and the like having been read from a memory device such as the storage device 23 and a ROM 113, the ROM 113 that stores a boot program and the like executed by the CPU 111, an interface (I/F) 114 for connecting various types of hardware to the arithmetic processing device 11, and a bus 115 that connects those components to each other.

The first display 21 is installed at the center of the console panel provided on the front surface inside the vehicle, for example. The first display 21 is a unit that displays graphics information. The first display 21 is formed of a liquid crystal display, an organic electroluminescence (EL) display, or the like, for example. Note that, as described later, a transparent touch panel 251 is layered on the first display 21. Therefore, a user can perform a touch operation on (the touch panel 251 layered on) the first display 21. However, an operation on the first display 21 may also be performed through use of a dial switch 252.

The second display 22 is installed in an instrument panel provided in front of a driver's seat, for example. For example, in a case of a vehicle in which a steering wheel is installed on a left side as in a US specification vehicle, the second display 22 is set on a left side to the first display 21 installed at the center of the console panel as seen from a user.

Note that, it is desired that a display for displaying an image of a speed indicator, a tachometer, and the like, the display being provided to the vehicle in advance, be also used for the second display 22. As a matter of course, the second display 22 dedicated to the onboard device 10 may be provided. The second display 22 is a unit that displays graphics information. The second display 22 is formed of a liquid crystal display, an organic EL display, or the like, for example.

The storage device 23 is formed of a storage medium capable of performing at least reading and writing, such as a hard disk drive (HDD) and a non-volatile memory card. Various pieces of information (for example, map information and the like) used by the arithmetic processing device 11 are stored in the storage device 23, for example.

The voice input/output device 24 includes a microphone 241 as a voice input device and the speaker 242 as a voice output device. The microphone 241 collects voice or sound outside the onboard device 10 in addition to voice that is made by a driver or a passenger (user utterance). The speaker 242 outputs voice or sound such as route guidance and the like for a driver and the like, which is generated by the arithmetic processing device 11.

The input device 25 is a device that receives an instruction input from a user. The input device 25 includes the touch panel 251, the dial switch 252, a scroll key being another hard switch, and the like (not illustrated). The input device 25 outputs information in accordance with an operation of the keys and switches to another device such as the arithmetic processing device 11.

The touch panel 251 is formed of a transparent material, and is layered on the display screen of the first display 21. The touch panel 251 detects a touch operation by a finger of a user or a touch pen (touch-on (contact), dragging (move in a contact state), and touch-off (release of contact)). Thus, while visually recognizing the display screen of the first display 21, a user can input various operations by touching the display screen (actually, the touch panel 251). A position of a touch operation of a user is specified based on an x-y coordination set on the touch panel 251, for example. The touch panel 251 is formed of input detection elements of a capacitive sensing type, for example.

The ROM device 26 is formed of a storage medium capable of at least reading digital data, such as a ROM exemplified by a compact disk (CD)-ROM and a digital versatile disk (DVD)-ROM and an integrated circuit (IC) card. Video data, audio data, voice data, and the like are stored in the storage medium, for example.

The vehicle speed sensor 27 acquires a value used for calculation of a vehicle speed. The gyro sensor 28 is formed of an optical fiber gyroscope, an oscillation gyroscope, or the like, and detects angular velocity of rotation of a moving body (vehicle). The GPS reception device 29 can measure a current place, a traveling speed, and a traveling direction of the moving body by receiving signals from GPS satellites and measuring distances between the moving body and the GPS satellites and rates of change of the distances with respect to three or more satellites. Those devices are used for the arithmetic processing device 11 in order to detect a current place of a vehicle to which the onboard device 10 is mounted.

The FM multiplex broadcasting reception device 30 receives FM multiplex broadcasting that is transmitted through use of an FM broadcasting wave. FM multiplex broadcasting includes an outline of current traffic information relating to vehicle-information-and-communication-system (VICS) information, regulation information, service area/parking area (SA/PA) information, parking lot information, weather information, character information as general FM multiplex information, and the like.

The beacon reception device 31 receives an outline of current traffic information relating to VICS information, regulation information, service area/parking area (SA/PA) information, parking lot information, weather information, an emergency alert, and the like. The beacon reception device 31 may be, for example, an optical beacon that performs communication through light or a radio wave beacon that performs communication through a radio wave. An image capturing device 32 is a so-called onboard camera, and captures an image of a vehicle inside and a vehicle outside (a periphery of a vehicle).

Figure 2:
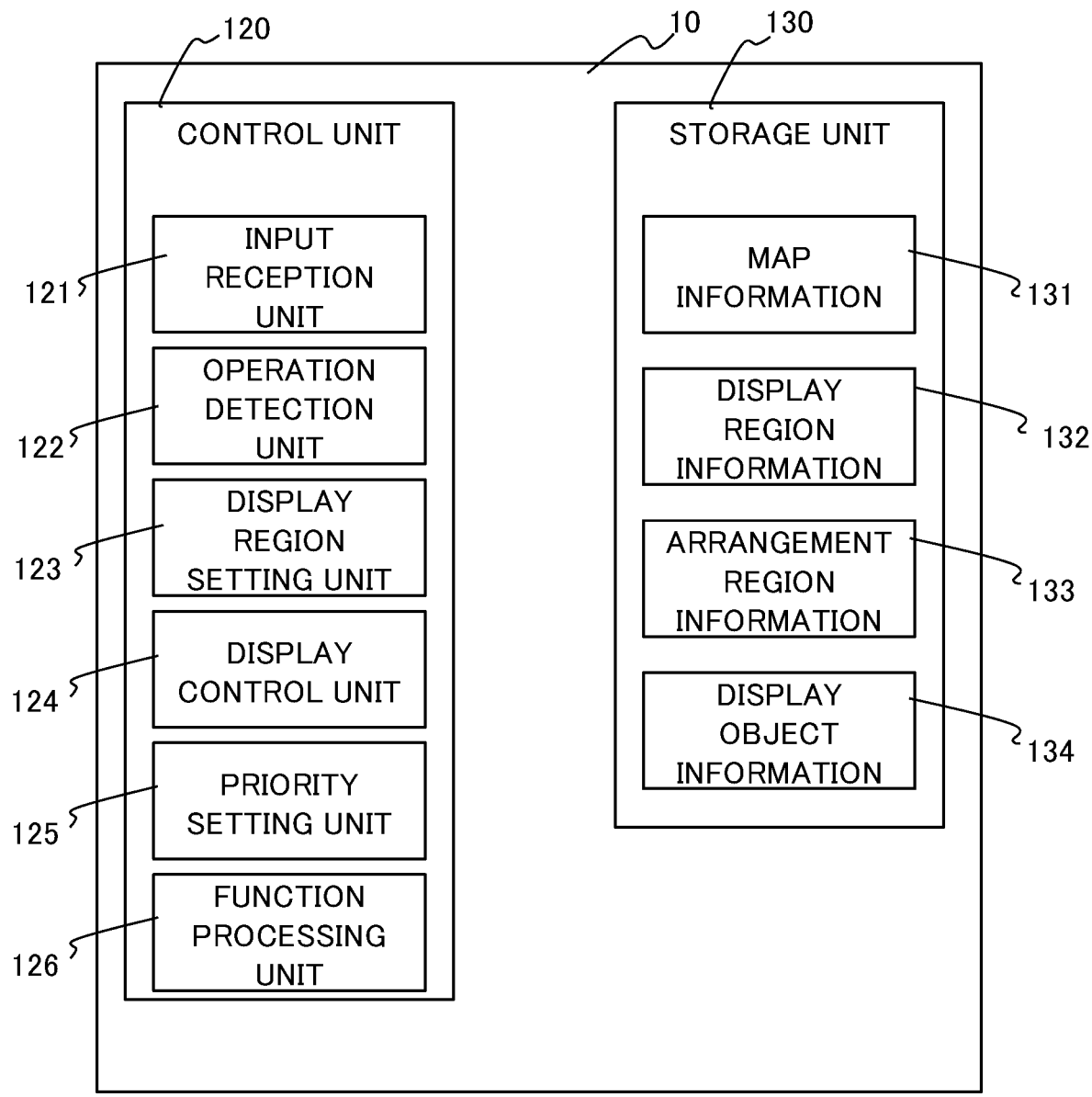
FIG. 2 is a diagram illustrating one example of a functional block of the onboard device.

Next, a functional block indicating a functional configuration of the onboard device 10 is described. FIG. 2 illustrates one example of a functional block of the onboard device 10.

The onboard device 10 includes a control unit 120 and a storage unit 130.

The control unit 120 includes an input reception unit 121, an operation detection unit 122, a display region setting unit 123, a display control unit 124, a priority setting unit 125, and a function processing unit 126.

The input reception unit 121 receives an instruction and an input of information from a user through the dial switch 252 included in the input device 25 or other hard switches. For example, the input reception unit 121 receives setting of a departure place and a target place, a search instruction for a recommended route, and the like through the input device 25 from a user.

The operation detection unit 122 detects a touch operation made by a user with respect to the touch panel 251 included in the input device 25. Specifically, the operation detection unit 122 detects touch-on, dragging, and touch-off with respect to the touch panel 251. The operation detection unit 122 specifies an x-y coordination on the touch panel 251 subjected to a touch operation.

The operation detection unit 122 can also detect a plurality of (for example, two) touches on the touch panel 251 within a predetermined time period (for example, 0.5 seconds), and can specify an x-y coordination on the touch panel 251 which indicates each touch position.

When detecting a touch operation (including touch-off), the operation detection unit 122 notifies the display region setting unit 123 and the function processing unit 126 of a type and an x-y coordination of the touch operation.

The display region setting unit 123 sets one or a plurality of display regions on the display screen of the first display 21. In accordance with an occurring event, the display region setting unit 123 can dynamically change a division state (positions and sizes) of the display regions or can encourage a user to change a division state of the display regions.

Here, the event refers to a touch operation of a user, change in vehicle speed, traffic information reception, emergency alert reception, transition to an automatic driving state, activation of an external camera, switching to a camera screen, reception of an e-mail/message, an incoming call, approach to an intersection, right/left turn guidance, a blinker operation, approach of an emergency vehicle, sleepiness detection, biological abnormality detection, recommendation based on behavior history (for example, a notification is issued near a daily visited shop), and the like.

Note that, in the following description, an example in which the display screen of the first display 21 is divided into three parts is given, but the number of divisions may be two, or four or more. The display region setting unit 123 may not divide the display screen, and may display only one display region on the display screen. Moreover, for example, in accordance with occurrence of an event such as an incoming call, a telephone screen may be displayed in an upsized manner or may be pop-up displayed while overlapping the three divided display regions that are currently displayed.

The display control unit 124 controls setting of an arrangement region and display of display objects for each of the display regions. The display control unit 124 sets attribute information (details thereof are described later) with respect to the arrangement region and the display objects. Moreover, the display control unit 124 changes a size and a position of the arrangement region, attribute information, and the like in accordance with change in size of the display region. The display control unit 124 changes positions of the display objects arranged on the arrangement region and attribute information in accordance with the change in size of the arrangement region.

The priority setting unit 125 sets priority with respect to the arrangement region provided on the display region and the display objects arranged on the arrangement region. The priority setting unit 125 can set an initial value determined in advance as priority with respect to the arrangement region and the display objects, and can change priority in accordance with an input from a user afterward.

The priority setting unit 125 may learn a situation where change is made to priority, and may change priority dynamically based on a learning result. Here, the situation refers to a state of information that can be acquired by the onboard device 10, such as a current place, a traveling speed, a traffic condition, a temperature, weather, a time range, and the like of a vehicle to which the onboard device 10 is mounted. Specifically, for example, at a predetermined time range, an arrangement region or a display object corresponding to an air-conditioning function may be high in priority or the like.

Moreover, the priority setting unit 125 can temporarily increase priority with respect to the arrangement region and the display object corresponding to the predetermined event in accordance with occurrence of the predetermined event, and can set the priority value, which is obtained by temporarily increasing the priority, to the original value in accordance with completion of the predetermined event.

Note that, when priority is changed, the arrangement region and the display of the display objects based on priority may be dynamically changed. The priority setting unit 125 updates arrangement region information 133, based on priority set among the arrangement regions, and updates display object information 134, based on priority set among the display objects.

The function processing unit 126 executes processing for achieving predetermined functions in accordance with a touch operation from a user with respect to an operation reception button displayed on the display region of the first display 21. The functions referred herein include, for example, a navigation function, an air-conditioning function, reproduction of a video or music, transmission/reception of an e-mail or a message, outgoing and incoming telephone calls, and the like.

The storage unit 130 stores predetermined information. The storage unit 130 is implemented with the ROM 113 and the storage device 23. Various types of information such as map information 131, display region information 132, the arrangement region information 133, the display object information 134, and others are stored in the storage unit 130.

Information on land forms, roads, and the like that are used for the navigation function is recorded as the map information 131.

Division states of the display regions provided on the display screen of the first display 21 are recorded as the display region information 132.

A shape, a size, a position, attribute information, and priority of the arrangement region provided on each of the display regions are recorded as the arrangement region information 133.

Data, attribute information, and priority with respect to the display objects (an icon, an image, a text, a pop-up, a list, and the like as operation reception buttons) displayed on each of the display regions are recorded as the display object information 134.

Note that the functional blocks of the onboard device 10, which are the input reception unit 121, the operation detection unit 122, the display region setting unit 123, the display control unit 124, the priority setting unit 125, and the function processing unit 126, are implemented by the CPU 111 executing predetermined programs. The programs are stored in the ROM 113 of the onboard device 10 or the storage device 23, and are loaded on the RAM 112 at the time of execution and executed by the CPU 111.

Each functional block illustrated in FIG. 2 is classified according to its main processing contents, for the sake of easier understanding of the functions of the onboard device 10 implemented in the present embodiment. Therefore, how each function is classified and referred to does not limit the present invention. Each configuration of the onboard device 10 can be classified into more components, according to the processing contents. Each configuration can be classified so that one component executes more processing.

All or a part of the functional blocks may be constituted by hardware (an integrated circuit such as an ASIC, or the like) implemented in a computer. Processing of each of the functional blocks may be executed by one piece of hardware, or may be executed by a plurality of pieces of hardware.

<Regarding Display Regions on Display Screen of First Display 21>

Next, display regions set on the display screen of the first display 21 are described. As described above, the onboard device 10 causes the display region setting unit 123 to divide the display screen of the first display 21, and thus a plurality of (in the present embodiment, three) display regions can be provided.

Figure 3A:
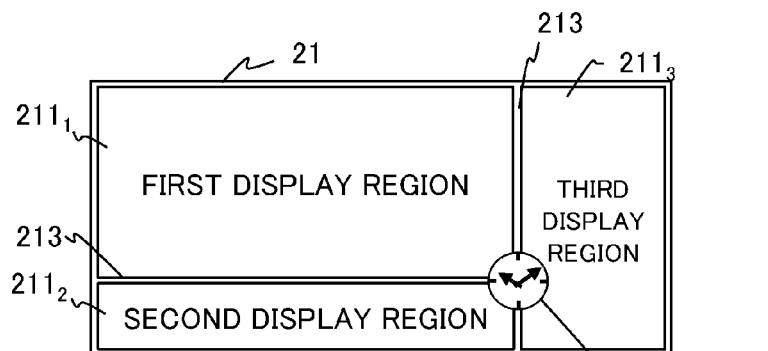
FIG. 3A to FIG. 3D are display examples of display regions that are set on a display screen of a first display.
Figure 3B:
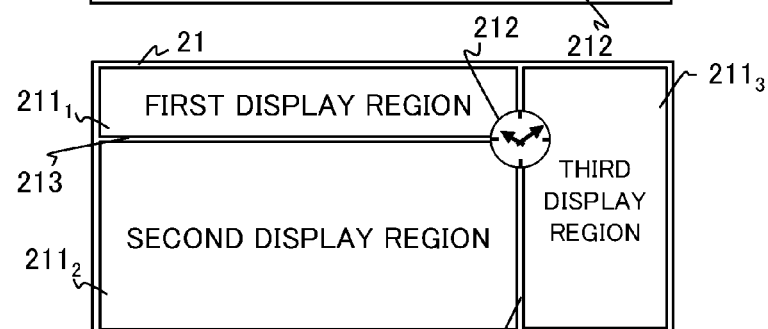
Figure 3C:
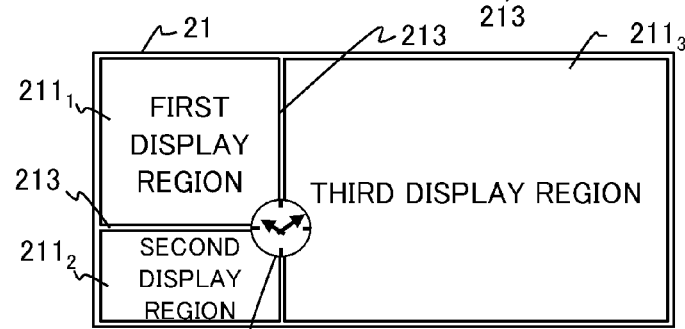
Figure 3D:
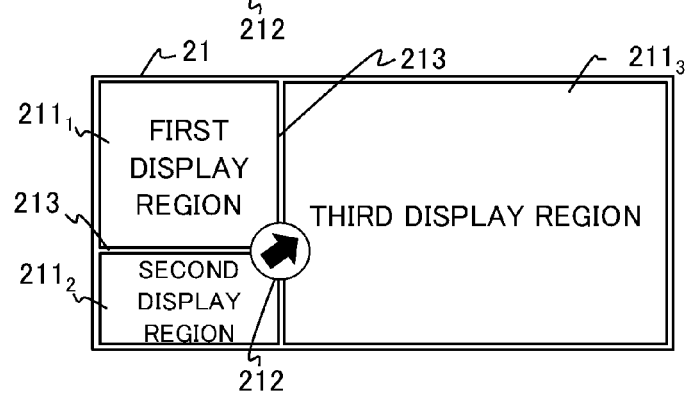

FIG. 3A to FIG. 3D are display examples of three display regions 211 (a first display region $211_1$, a second display region $211_2$, and a third display region $211_3$) that are set on the display screen of the first display 21. FIG. 3A illustrates a first display example, FIG. 3B illustrates a second display example, FIG. 3C illustrates a third display example, and FIG. 3D illustrates a fourth display example.

For example, a navigation screen, an air-conditioning screen, an AV screen, an application (App) screen, a telephone screen, a camera screen, or the like can be allocated to each of the display regions 211. A plurality of operation reception buttons relating to different functions (for example, air-conditioning, audio, and telephone) may be mixed and displayed on one display region 211.

When the plurality of display regions 211 are provided on the first display 21, a moving display region 212 is provided by the display control unit 124 at a position at which boundary regions 213 between the display regions 211 intersect each other. A specific display object can be displayed on the moving display region 212. When a user touches on and drags the specific display object displayed on the moving display region 212, the display control unit 124 moves a display position of the moving display region 212.

Then, the display region setting unit 123 dynamically changes a size of each of the display regions 211 on the display screen in accordance with moving of the moving display region 212, and fixes a size of each of the display regions 211 when a user touches off from the moving display region 212.

For example, under a state of FIG. 3A, when a user touches on the specific display object, which is displayed on the moving display region 212, and drags the specific display object upward, the display region setting unit 123 dynamically changes the display regions 211 to a state of FIG. 3B, by extending a vertical width of the second display region $211_2$ and reducing a vertical width of the first display region $211_1$ by the same amount.

For example, under the state of FIG. 3B, when a user touches on the specific display object, which is displayed on the moving display region 212, and drags the specific display object in a lower left direction, the display region setting unit 123 dynamically changes the display regions 211 to a state of FIG. 3C, by extending a lateral width of the third display region $211_3$ and reducing lateral widths of the first display region $211_1$ and the second display region $211_2$ by the same amount while extending the vertical width of the first display region $211_1$ and reducing the vertical width of the second display region $211_2$ by the same amount.

Note that moving of the moving display region 212 and change in size of each of the display regions 211 along with the moving are performed in accordance with occurrence of an event as well as with an operation from a user.

In the examples of FIG. 3A to FIG. 3C, as the specific display object, an image of an analog clock indicating a current time is displayed on the moving display region 212. In addition to or instead of a time, information changing along with a lapse of time, such as a temperature, humidity, a weather condition, a vehicle speed, output horsepower, an output torque, and an amount of generated power may be displayed on the moving display region 212, with a character, a number, or an image such as a gauge. Information to be displayed on the moving display region 212 can be freely selected by a user.

The specific display object to be displayed on the moving display region 212 may be changed in accordance with occurrence of an event. For example, display on the moving display region 212 may be changed from the state of displaying a time to information indicating an event content in accordance with an event such as an incoming call, reception of an e-mail or a message, emergency warning reception, and the like.

An example of FIG. 3D illustrates a state in which an arrow is displayed as the specific display object on the moving display region 212 in accordance with an occurring event, the arrow encouraging a user to change the division state of the display regions 211. The arrow indicates a direction for a user to touch on and drag the moving display region 212. In the case of FIG. 3D, the arrow encourages a user to drag the moving display region 212 in an upper right direction in such a way as to upsize the second display region $211_2$ and downsize the first display region $211_1$ and the third display region $211_3$.

Displaying the arrow as the specific display object on the moving display region 212 encourages a user to change the division state of the display regions 211, and allows the user to understand a direction to perform dragging. A user can perform an operation of changing the division state of the display regions 211 with his or her own intention.

Note that, while the specific display object displayed on the moving display region 212 is moved by a touch operation of a user, the user cannot visually recognize the specific display object due to his or her own finger. Thus, while the specific display object displayed on the moving display region 212 is being moved, updating of the specific display object on the moving display region 212 may be stopped, the specific display object may be deleted, or the specific display object may be changed to another image (for example, a logo mark or the like). While the specific display object displayed on the moving display region 212 is being moved, a size of the specific display object may be reduced, or may be increased alternatively.

Moreover, regardless of moving of the specific display object displayed on the moving display region 212, a size or a display content of the specific display object need not necessarily be changed.

A size of the moving display region 212 and a size of the specific display object displayed thereon may be freely selected by a user. In accordance with occurrence of an event, a size of the moving display region 212 and a size of the specific display object displayed thereon may be changed temporarily.

The moving display region 212 is arranged at a position at which the plurality of display regions 211 intersect each other, and hence can be easily recognized by a user. Therefore, when information that is frequently required by a user (for example, an analog clock indicating a time) is displayed on the moving display region 212, convenience for the user can be improved.

Note that predetermined information may be displayed on the boundary regions 213. A width of the boundary region 213 may be narrowed in such a way as to be displayed substantially as a line.

Note that a minimum size from which the size is not allowed to be reduced may be set for each of the display regions 211.

The display region setting unit 123 dynamically changes a state of each of the display regions 211. In response to this, the display control unit 124 dynamically changes display of a display object arranged on each of the display regions 211. Details thereof are described later.

However, a division state of each of the display regions 211 provided on the display screen of the first display 21 is not limited to the display examples in FIG. 3A to FIG. 3D, and is freely changed in accordance with an operation from a user.

Not only the touch panel 251 but also the dial switch 252 can be used for reception of an operation of a user with respect to the moving display region 212 on the display screen.

<Regarding Arrangement Regions 301 Provided on Display Region 211>

Figure 4:
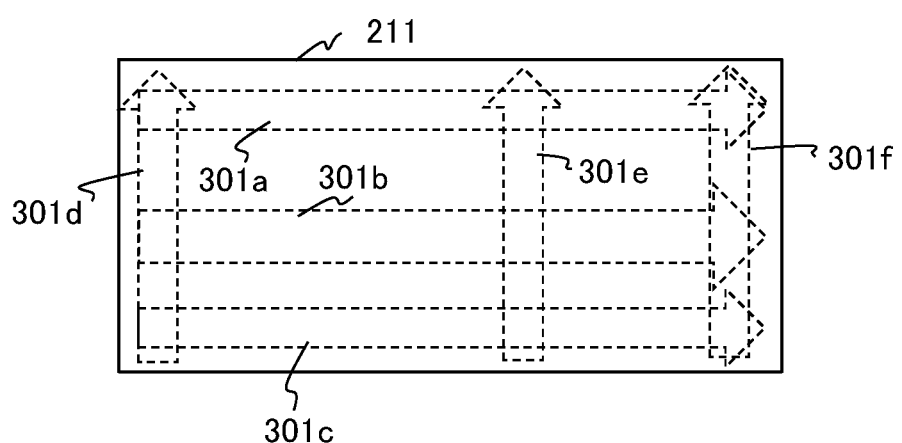
FIG. 4 is a diagram illustrating an example of an arrangement region that is set on a display region.

Next, arrangement regions 301 provided on each of the display regions 211 are described. FIG. 4 illustrates one example of the plurality of arrangement regions 301a to 301f provided on the display region 211.

Each of the arrangement regions 301a to 301f is a region for arranging display objects such as an operation reception button, various icons, a thumbnail image, and text information. Note that, in the drawing, positions of the arrangement regions 301a to 301f on the display region 211 are indicated with broken lines, but indication of the arrangement regions 301 are not actually displayed on the screen.

In the example in FIG. 4, the arrangement regions 301a, 301b, and 301c that extend in a lateral direction and the arrangement regions 301d, 301e, and 301f that extend in a vertical direction are provided on the display region 211. In the following description, when there is no need to distinguish the arrangement regions 301a to 301f from one another, the arrangement region 301 is simply referred to.

A two, or three or more dimensional coordination system independent from the x-y coordination system provided on the display screen of the first display 21 is provided on the arrangement region 301. With this, display of display objects 302 on each of the arrangement regions 301 can be changed easily. When a two-dimensional coordination system is provided on the arrangement region 301, the arrangement region 301 has an area. When a three-dimensional coordination system is provided on the arrangement region 301, the arrangement region 301 has a volume.

The arrangement regions 301 have axes (all of which are not illustrated) each having a direction (vector) extending from one end (start point) to the other end (end point) of the region (hereinafter, referred to as directional axes). The directional axes of the arrangement regions 301 are not limited to linear lines parallel to the lateral direction or the vertical direction of the display regions 211, and may be linear lines in an oblique direction. The directional axes are not limited to linear lines, and may be curved lines.

The arrangement regions 301 each have a rectangular shape, for example. However, in FIG. 4, in order to indicate the directions of the directional axes, the arrangement regions 301 are illustrated as arrow regions. Note that the arrangement regions 301 are not limited to rectangular shapes, and may have other shapes.

Hereinafter, a length of the directional axis of the arrangement region 301 is referred to as a directional-axis length, and a length in a direction orthogonal to the directional axis of the arrangement region 301 is referred to as a width.

In accordance with change in size of the display region 211, the arrangement region 301 is changed in directional-axis length and position while maintaining the directional axis and width. A maximum value can be set for the directional-axis length of the arrangement region 301.

The display control unit 124 can set, for the arrangement region 301, an offset value indicating a distance from an end of the display region 211 to the arrangement region 301, in accordance with an operation from a user. Moreover, the display control unit 124 can set, for the arrangement region 301, an offset value indicating a distance from an end of the display region 211 to the arrangement region 301, in accordance with the width thereof. For example, for the arrangement region 301c, which is adjacent to the lower side of the display region 211 and extends in the lateral direction, the display control unit 124 can set an offset value from the lower side, in accordance with the width of the arrangement region 301c. Similarly, for the arrangement region 301a, which is adjacent to the upper side of the display region 211 and extends in the lateral direction, the display control unit 124 can set an offset value from the upper side, in accordance with the width of the arrangement region 301a. For the arrangement region 301d, which is adjacent to the left side of the display region 211 and extends in the vertical direction, the display control unit 124 can set an offset value from the left side, in accordance with the width of the arrangement region 301d. Similarly, for the arrangement region 301f, which is adjacent to the right side of the display region 211 and extends in the vertical direction, the display control unit 124 can set an offset value from the right side, in accordance with the width of the arrangement region 301f.

The arrangement regions 301 may be set to be visible or invisible as attribute information. Display objects 302 (FIG. 7) arranged on the arrangement region 301 set to be visible are displayed on the screen. In contrast, display objects 302 arranged on the arrangement region 301 set to be invisible are not displayed on the screen.

The arrangement region 301 may be set to have priority relative to other arrangement regions 301 provided on the same display region 211. Note that, in the present embodiment, a greater value of priority of the arrangement region 301 indicates a higher priority order. The value of priority of the arrangement region 301 is set to an initial value determined in advance by the priority setting unit 125. Regarding priority of the arrangement region 301, priority may be changed in accordance with an operation from a user. Further, the priority setting unit 125 may learn a situation where change is made to priority, and may change priority dynamically in accordance with a learning result. Moreover, priority of the arrangement region 301 may be changed temporarily in accordance with occurrence of an event.

As attribute information, the arrangement region 301 may be set whether or not the arrangement region 301 interferes with another arrangement region in a case where the arrangement regions 301 provided on the same display region 211 are close to each other at a predetermined distance or shorter therebetween. Here, the case where the arrangement regions 301 are close to each other at a predetermined distance or shorter therebetween includes a case of contact and a case of overlapping.

The interference indicates that attribute information relating to the arrangement region 301 with lower priority is changed from visible to invisible and that all the display objects arranged on the arrangement region 301 with lower priority are collectively removed from the screen. In the following description, an action of changing attribute information from visible to invisible and removing the display objects from the screen is also referred to as "weeding-out".

For example, the arrangement regions 301 having the directional axes parallel to each other (for example, the arrangement region 301a and the arrangement region 301b) can be set as "to be interfered", and the arrangement regions 301 having the directional axes intersecting each other (for example, the arrangement region 301a and the arrangement region 301d) can be set as "not to be interfered".

Moreover, even when the arrangement regions 301 provided on the same display region 211 are not close to each other at the predetermined distance or shorter therebetween, in a case where the display region 211 is downsized to a predetermined size or smaller, all the display objects arranged on the arrangement region 301 with lower priority may be weeded out collectively. Moreover, even when the arrangement regions 301 provided on the same display region 211 are not close to each other at the predetermined distance or shorter therebetween, in a case where the display objects 302 arranged in the arrangement regions 301 are close to each other at a predetermined distance or shorter therebetween, all the display objects arranged on the arrangement region 301 with lower priority may be weeded out collectively.

<Change in Setting of Arrangement Region 301 in conformity with Change in Size of Display Region 211>

Next, change in setting of the arrangement region 301 in conformity with change in size of the display region 211 is described.

Figure 5:
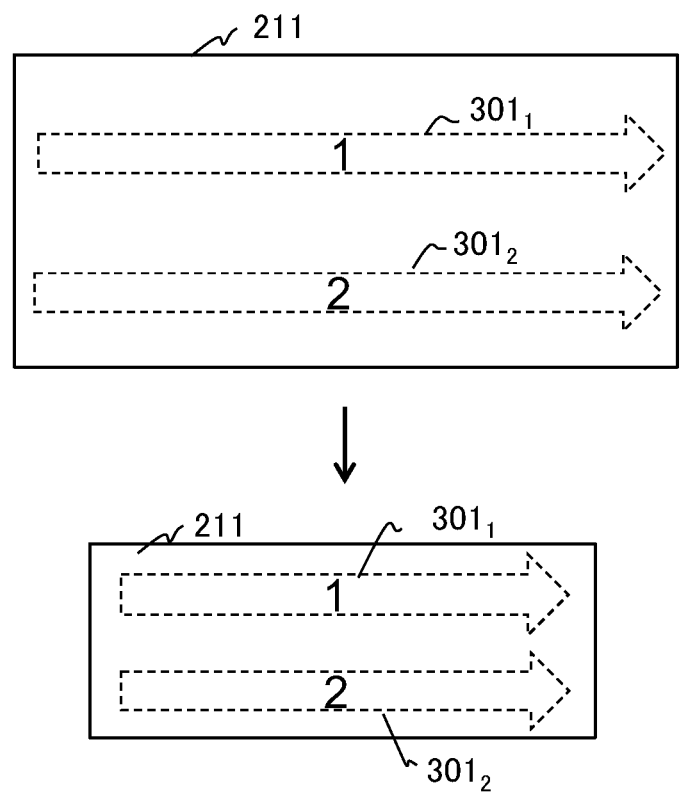
FIG. 5 is a diagram for describing an overview of change in setting of the arrangement region in conformity with change in size of the display region.

Each of FIG. 5 and FIG. 6 is a diagram for describing an overview of change in setting of arrangement regions $301_1$ and $301_2$ provided on the display region 211, in conformity with change in size of the display region 211.

In the examples of FIG. 5 and FIG. 6, on the display region 211, the arrangement regions $301_1$ and $301_2$ being different in priority are provided. Each subscript number denoted to the arrangement region 301 is a value indicating priority, and a larger number indicates higher priority. Therefore, priority of the arrangement region $301_1$ is 1, and priority of the arrangement region $301_2$ is 2. Thus, the arrangement region $301_2$ has priority higher than priority of the arrangement region $301_1$. In the example of FIG. 6, the widths of the arrangement regions $301_1$ and $301_2$ are set to be wider than those in the example of FIG. 5.

In the examples of FIG. 5 and FIG. 6, when the size of the display region 211 is changed from a state in the upper row to a state in the lower row in accordance with an operation from a user, the directional-axis lengths of the arrangement regions $301_1$ and $301_2$ are reduced under a state of maintaining the direction of the directional axes and widths. The interval between the arrangement regions $301_1$ and $301_2$ is narrowed.

As a result, in the example of FIG. 5, the arrangement region $301_1$ and the arrangement region $301_2$ do not overlap each other even partially, the arrangement regions $301_1$ and $301_2$ are not weeded out.

Meanwhile, in the example of FIG. 6, the arrangement region $301_1$ and the arrangement region $301_2$ partially overlap each other, and hence attribute information relating to the arrangement region $301_1$ having lower priority is changed from visible to invisible, and the arrangement region $301_1$ is weeded out in an arrangement region unit. In other words, all the display objects (not illustrated) arranged on the arrangement region $301_1$ are collectively removed from the screen.

However, as in the example of FIG. 5, even when the arrangement region $301_1$ and the arrangement region $301_2$ do not partially overlap each other, in a case where the display region 211 is reduced to a size smaller than a predetermined size, the arrangement region $301_1$ having lower priority may be weeded out.

Note that, instead of weeding out the arrangement region $301_1$ having lower priority in an arrangement region unit, the display objects (not illustrated) arranged on the arrangement region $301_1$ may be set to be moved. Details thereof are described later with reference to FIG. 13.

In contrast, in the examples of FIG. 5 and FIG. 6, when the size of the display region 211 is changed from the state in the lower row to the state in the upper row in accordance with an operation from a user, the directional-axis lengths of the arrangement regions $301_1$ and $301_2$ are extended under a state of maintaining the direction of the directional axes and widths. The interval between the arrangement regions $301_1$ and $301_2$ is broadened.

As a result, in the example of FIG. 6, partial overlapping between the arrangement region $301_1$ and the arrangement region $301_2$ is canceled. Thus, attribution information relating to the arrangement region $301_1$ having lower priority is changed from invisible to visible, and display of the display objects (not illustrated) arranged on the arrangement region $301_1$ is restored.

As described above, when the arrangement region $301_1$ and the arrangement region $301_2$ are close to each other at the predetermined distance or shorter therebetween, one of them is weeded out in accordance with priority. Thus, redundant determination on the display objects arranged on the arrangement regions $301_1$ and $301_2$ can be omitted.

Note that the priority setting unit 125 may dynamically change relative priority of the arrangement regions 301 provided on the same display region 211, from the initial value set in advance. Specifically, for example, the priority setting unit 125 may set a greater value of priority for the arrangement region 301 with the displayed objects being arranged thereon (not illustrated) on which an operation from a user is performed more recently. For example, a value of priority may be set greater for the arrangement region 301 with the displayed objects being arranged thereon (not illustrated) on which an operation from a user is performed more frequently. In this manner, the display objects that are more likely to be operated from a user are displayed preferentially, and hence user operability can be improved.

<Attribute Information Relating to Display Objects 302>

Figure 7:
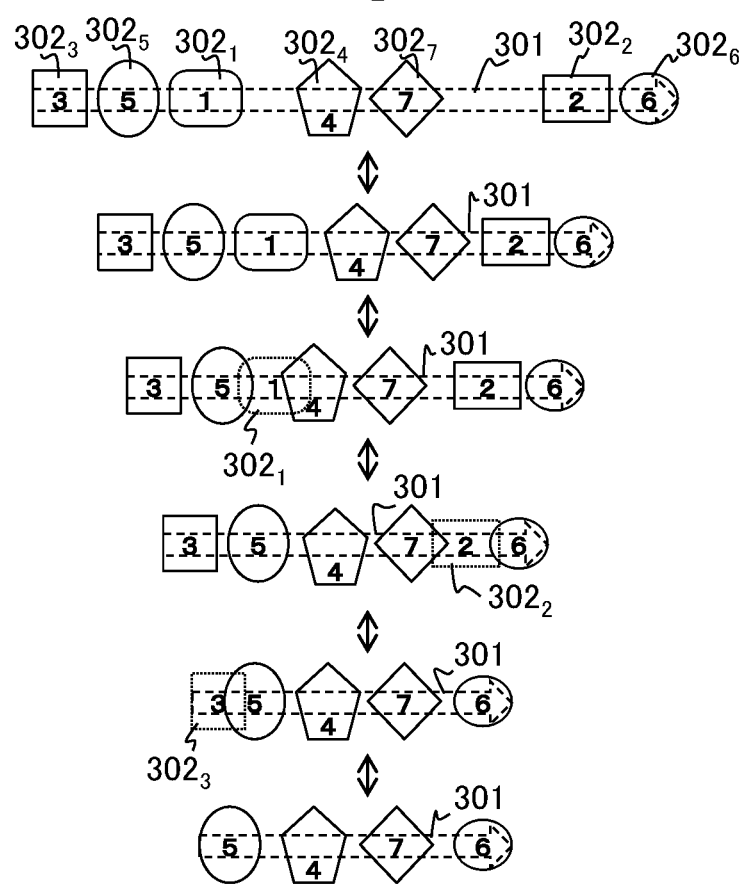
FIG. 7 is a diagram for describing attribute information relating to display objects (visible or invisible).

Next, FIG. 7 is a diagram for describing relative priority with respect to display objects $302_1$ to $302_7$ arranged on the arrangement region 301, and describing visible or invisible as attribute information. Here, when there is no need to distinguish the display objects $302_1$ to $302_7$ from one another individually, the display object 302 is simply referred to.

The plurality of display objects 302 arranged on the arrangement region 301 can be set to have priority relative to other display objects 302 arranged on the same arrangement region 301. A subscript number following the display object 302 is a value indicating priority. In the present embodiment, a greater value indicates higher priority. In the following drawings, the same is applied. As attribute information, the display objects 302 arranged on the arrangement region 301 are set to be visible or invisible.

In the example of FIG. 7, the display objects $302_1$ to $302_7$ being different in priority are arranged on the arrangement region 301. Under a state illustrated in the uppermost row, attribution information relevant to the display objects $302_1$ to $302_7$ is set to be visible.

For example, when the directional-axis length of the arrangement region 301 is reduced in accordance with change in size (downsizing) of the display region 211 (not illustrated) from the state illustrated in the uppermost row in accordance with occurrence of an event, the display objects $302_1$ to $302_7$ are displayed at closer intervals while maintaining the sizes as illustrated in the second row of FIG. 7.

Moreover, as illustrated in the third row of FIG. 7, when the directional-axis length of the arrangement region 301 is further reduced and the display objects $302_1$ to $302_7$ cannot be arranged separately, the display object $302_1$ having the lowest priority among the display objects $302_1$ to $302_7$ is weeded out (attribution information is changed from visible to invisible). As a result, a state in which the display objects $302_2$ to $302_7$ other than the display object $302_1$ are displayed on the arrangement region 301 is achieved.

Moreover, as illustrated in the fourth row of the FIG. 7, when the directional-axis length of the arrangement region 301 is further reduced and the display objects $302_2$ to $302_7$ cannot be arranged separately, the display object $302_2$ having the lowest priority among the display objects $302_2$ to $302_7$ is weeded out (attribution information is changed from visible to invisible). As a result, a state in which the display objects $302_3$ to $302_7$ other than the display objects $302_1$ and $302_2$ are displayed on the arrangement region 301 is achieved.

Similarly in the fifth and sixth rows of FIG. 7, when the directional-axis length of the arrangement region 301 is reduced, the display objects 302 are weeded out in the priority order from a lower priority side.

In contrast, when the directional-axis length of the arrangement region 301 is extended in accordance with change in size (upsizing) of the display region 211 (not illustrated), display of the display objects 302 is changed from the lower side to the upper side of FIG. 7. In other words, display of the weeded-out display objects 302 (ones having attribute information changed to invisible) is restored on the arrangement region 301 in the priority order from a higher priority (attribute information is changed from invisible to visible).

Relative priority among the display objects 302 arranged on the same arrangement region 301 is set to an initial value in advance, and may be changed by the priority setting unit 125 in accordance with an operation from a user. When the display objects 302 are operation reception buttons, the priority setting unit 125 may change priority in accordance with frequency of an operation from a user or may set priority of the most recently operated object to the highest order. Further, the priority setting unit 125 may dynamically change priority in accordance with a vehicle traveling situation (speed and the like). For example, priority of the display object 302 being a character string is lowered during traveling. Moreover, the priority setting unit 125 may learn a situation where change is made to priority, and may change priority dynamically in accordance with a learning result. With this, visibility of the display objects 302 for a user and operability of the display objects 302 being operation reception buttons can be improved.

Figure 8:
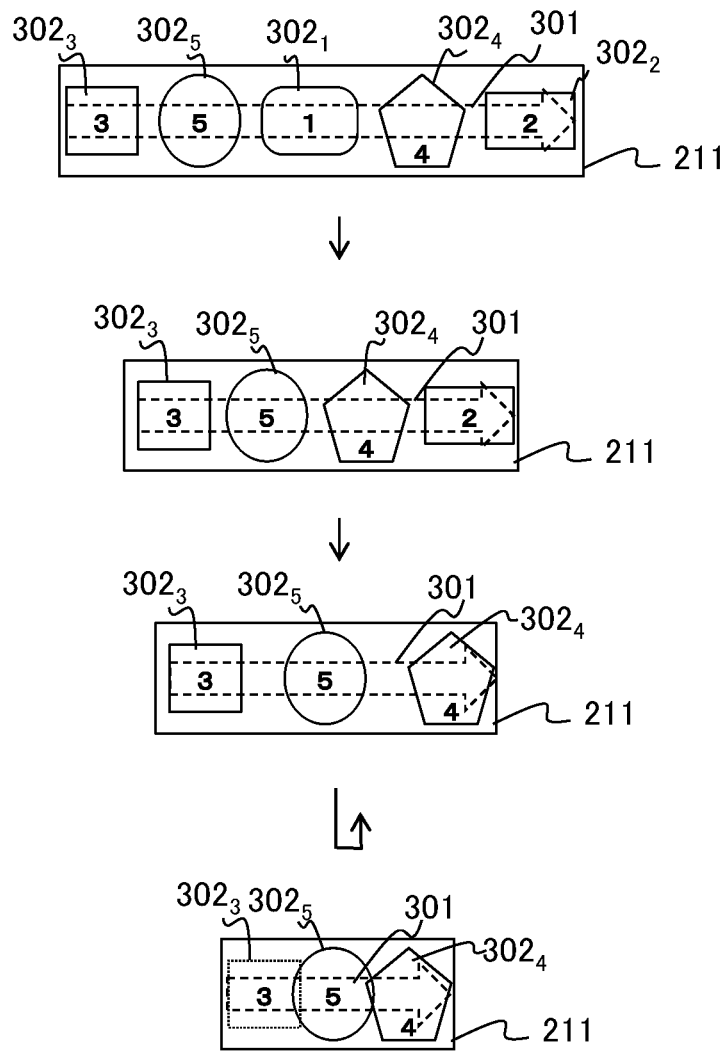
FIG. 8 is a diagram for describing attribute information relating to the display objects ("allowed to be weeded out" or "not allowed to be weeded out").

Subsequently, FIG. 8 is a diagram for describing relative priority with respect to the display objects $302_1$ to $302_5$ arranged on the arrangement region 301, and describing "allowed to be weeded out" or "not allowed to be weeded out" as attribution information. Here, when there is no need to distinguish the display objects $302_1$ to $302_5$ from one another individually, the display object 302 is simply referred to.

Among the plurality of display objects 302 arranged on the arrangement region 301, the display objects 302 having priority less than an arbitrary degree can be set as "allowed to be weeded out", and the display object 302 having priority equal to or higher than the arbitrary degree can be set as "not allowed to be weeded out" as attribute information in addition to the priority described above. Note that, in the above-described example illustrated in FIG. 7, it can be regarded that all the display objects $302_1$ to $302_7$ are set as "allowed to be weeded out".

When the display region 211 is downsized in accordance with occurrence of an event, the arrangement region 301 is reduced, and the display objects 302 are thus close to the other display objects 302 arranged on the same arrangement region 301 to be at the predetermined distance or shorter therebetween, the display objects 302 set as "allowed to be weeded out" are weeded out in accordance with priority (attribution information is changed from visible to invisible).

Meanwhile, even when the display region 211 is downsized in accordance with occurrence of an event, the arrangement region 301 is reduced, and the display objects 302 are thus close to the other display objects 302 arranged on the same arrangement region 301 to be at the predetermined distance or shorter therebetween, the display objects 302 set as "not allowed to be weeded out" are not weeded out. Moreover, downsizing of the display region 211 and reduction of the arrangement region 301 are canceled.

In the example of FIG. 8, it is assumed that the display objects $302_1$ to $302_5$ are arranged on the arrangement region 301 provided on the display region 211, and that the display objects $302_1$ and $302_2$ each having priority degree less than 3 are set as "allowed to be weeded out" and the display objects $302_3$ to $302_5$ each having a priority degree equal to or more than 3 are set as "not allowed to be weeded out.

For example, when the display region 211 is downsized from the state illustrated in the uppermost row of FIG. 8 in accordance with occurrence of an event, the arrangement region 301 is reduced, and the display objects 302 are thus close to each other at the predetermined distance or shorter therebetween, the display object $302_1$ having the lowest priority is a target to be weeded out, and the display object $302_1$ is weeded out since the display object $302_1$ is set as "allowed to be weeded out", as illustrated in the second row of FIG. 8.

Subsequently, when the display region 211 is further downsized from the state illustrated in the second row of FIG. 8 in accordance with occurrence of an event, the arrangement region 301 is reduced, and the display objects 302 are thus close to each other at the predetermined distance or shorter therebetween, the display object $302_2$ having the second lowest priority is a target to be weeded out, and the display object $302_2$ is weeded out since the display object $302_2$ is set as "allowed to be weeded out", as illustrated in the third row of FIG. 8.

Then, when the display region 211 is further downsized from the state in the third row of FIG. 8 in accordance with occurrence of an event, the arrangement region 301 is reduced, and the display objects 302 are thus close to each other at the predetermined distance or shorter therebetween, the display object $302_3$ having the third lowest priority is a target to be weeded out. However, the display object $302_3$ is set as "not allowed to be weeded out", and thus is not weeded out to maintain its display, as illustrated in the fourth row of FIG. 8. Downsizing of the display region 211 and reduction of the arrangement region 301 are canceled, and the state in the third row of FIG. 8 is restored.

Note that when an occurring event is a touch operation of a user, and reduction of the display region 211, which is to be performed in accordance with the touch operation, is canceled, the display control unit 124 may notify the user of the cancel. A notification method may use sound or vibration in place of screen display. With this, the user can recognize that reduction of the display region 211 in accordance with his or her own operation is canceled.

Note that the plurality of display objects 302 arranged on the same arrangement region 301 are set in advance as "allowed to be weeded out" or "not allowed to be weeded out", but may be changed by the priority setting unit 125 in accordance with an operation from a user. In accordance with occurrence of a predetermined event, the display object(s) 302 corresponding to the event may be temporarily set as "not allowed to be weeded out". Moreover, when the display object 302 is an operation reception button, the priority setting unit 125 may change the display object 302 to be "not allowed to be weeded out" depending on frequency of an operation from a user. As described above, when the display object 302 can be set as "not allowed to be weeded out", the display object 302, weeding out of which is not preferable, can always be displayed on the display region 211. Thus, convenience and operability for a user can be improved.

Next, description is made on setting in which, when the arrangement regions 301 provided on the same display region 211 are close to each other at the predetermined distance or shorter therebetween, the display objects arranged on the arrangement region $301_1$ are moved instead of weeding out the arrangement region $301_1$ having lower priority in an arrangement region unit.

In the description with reference to FIG. 6, when the arrangement regions $301_1$ and $301_2$ provided on the same display region 211 partially overlap each other, the arrangement region $301_1$ having lower priority is weeded out in an arrangement region unit. However, setting can be performed in such a way as to move the display objects 302 arranged on the arrangement region $301_1$ having lower priority.

FIG. 9 illustrates an example of moving the display objects arranged on the arrangement region $301_1$ having lower priority when the plurality of arrangement regions 301 provided on the same display region 211 partially overlap each other.

In the example of FIG. 9, the arrangement region $301_1$ having a priority degree of 1 and the arrangement region $301_2$ having a priority degree of 2, which are provided on the display region 211, are set to interfere each other. The seven display objects 302 being different in priority are arranged on the arrangement region $301_1$, and the six display objects 302 being different in priority are arranged on the arrangement region $301_2$.

For example, when the display region 211 is downsized from the state illustrated in the upper row, the arrangement regions $301_1$ and $301_2$ have an interval therebetween that is gradually narrowed under a state of maintaining the directions of the directional axes and widths, and finally overlap (intersect) each other partially, as illustrated in the lower row in FIG. 9. In this case, arrangement of the six display objects 302 on the arrangement region $301_2$ having priority higher than that of the arrangement region $301_1$ is not changed. Meanwhile, on the arrangement region $301_1$ having lower priority, the display objects $302_7$ and $302_2$ are moved in right-and-left directions in order to prioritize the display objects 302 arranged on the arrangement region $301_2$. As a result, the seven display objects 302 cannot be arranged on the arrangement region $301_1$, separately. Thus, the display object $302_1$ having the lowest priority on the arrangement region $301_1$ is weeded out (attribution information is changed from visible to invisible).

In contrast, when the display region 211 is upsized from the state illustrated in the lower row, display of the display object $302_1$ is restored on the arrangement region $301_1$ as illustrated in the upper row of FIG. 9 (attribution information is changed from invisible to visible).

<Display Control Processing Performed by Onboard Device 10>

Figure 10:
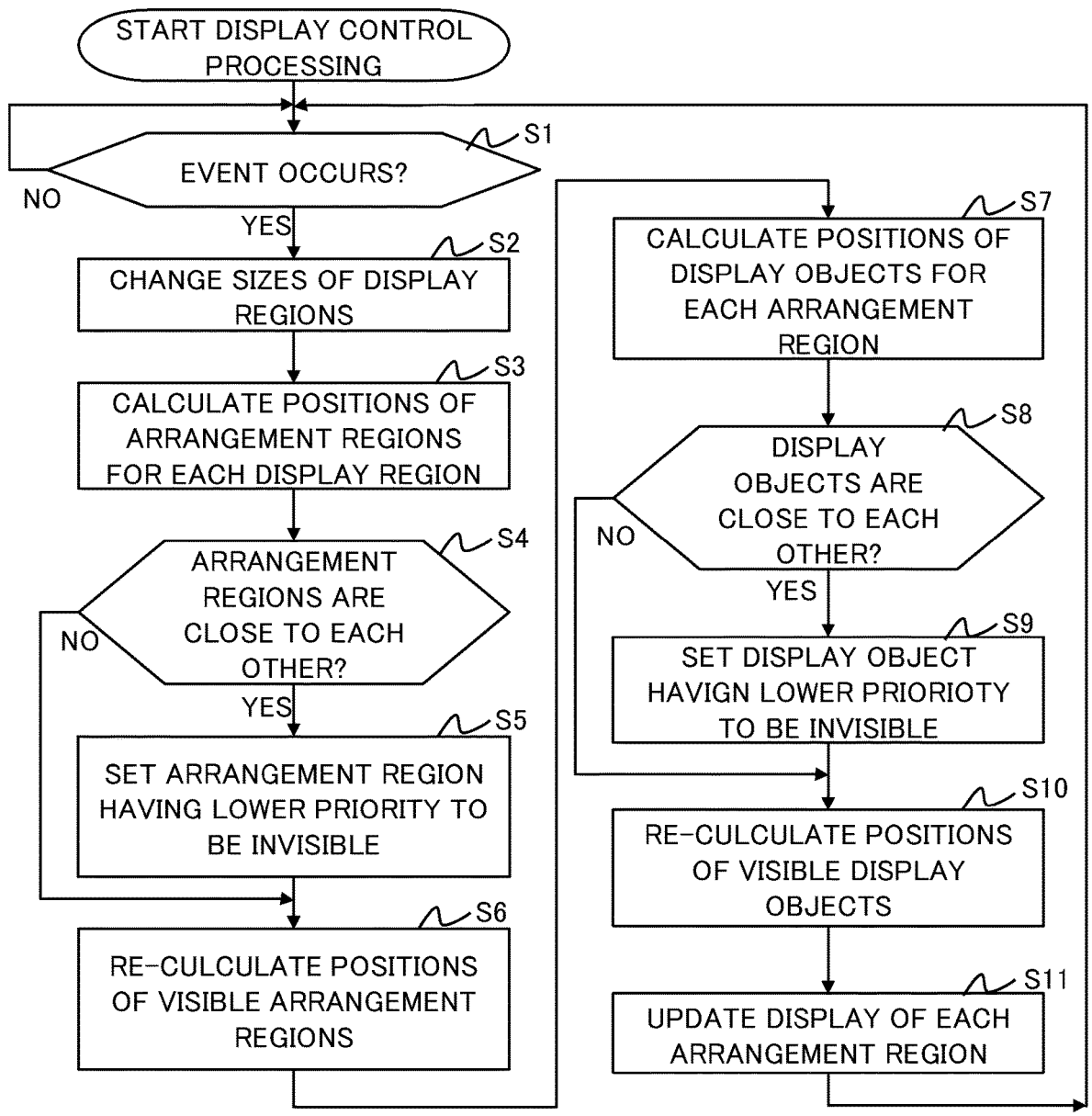
FIG. 10 is a flowchart illustrating one example of display control processing executed by an onboard device 10.

Next, FIG. 10 is a flowchart illustrating one example of the display control processing executed by the onboard device 10.

The display control processing is started after activation of the onboard device 10, and is continuously executed until an operation of the onboard device 10 is completed.

First, the display region setting unit 123 determines whether an event for causing change in size of the display region 211 occurs (Step S1). Here, when it is determined that an event for causing change in size of the display region 211 does not occur (NO in Step S1), the display region setting unit 123 repeats the determination. When it is determined that an event for causing change in size of the display region 211 occurs (YES in Step S1), the display region setting unit 123 changes the size of the display region 211 in accordance with an occurring event (Step S2).

Subsequently, in accordance with the display region 211 having a size changed in Step S2, the display control unit 124 calculates sizes and positions of the arrangement regions 301 which are provided on each of the display regions 211 and are set to be visible as attribution information, in accordance with a predetermined rule (Step S3). Subsequently, the display control unit 124 determines whether the arrangement regions 301 which are calculated in Step S3 and are provided on the same display region 211, are close to each other at the predetermined distance or shorter therebetween (including contact and overlapping) (Step S4).

Here, when it is determined that the arrangement regions 301 provided on the same display region 211 are close to each other at the predetermined distance or shorter therebetween (YES in Step S4), the display control unit 124 changes attribution information from visible to invisible, the attribution information relating to the arrangement region 301 having lower priority among closed arrangement regions 301 (Step S5). In contrast, when it is determined that the arrangement regions 301 provided on the same display region 211 are not close to each other at the predetermined distance or shorter therebetween (NO in Step S4), the display control unit 124 skips Step S5.

Subsequently, in accordance with the display region 211 having a division state changed in Step S2, the display control unit 124 re-calculates sizes and positions of the arrangement regions 301 which are provided on each of the display regions 211 and are set to be visible as attribution information, in accordance with a predetermined rule (Step S6).

Subsequently, the display control unit 124 calculates positions of the display objects 302 which are set to be visible as attribute information and are arranged on each of the arrangement regions 301 on each of the display regions 211, in accordance with a predetermined rule (Step S7). Subsequently, the display control unit 124 determines whether the display objects 302 which are calculated in Step S7 and are arranged on the same arrangement region 301, are close to each other at the predetermined distance or shorter therebetween (Step S8).

Here, when it is determined that the display objects 302 arranged on the same arrangement region 301 are close to each other at the predetermined distance or shorter therebetween (YES in Step S8), the display control unit 124 changes attribution information from visible to invisible, the attribution information relating to the display object 302 having lower priority among closed display objects 302 (Step S9). In contrast, when it is determined that the display objects 302 arranged on the same arrangement region 301 are not close to each other at the predetermined distance or shorter therebetween (NO in Step S8), the display control unit 124 skips Step S9.

Subsequently, the display control unit 124 re-calculates positions of the display objects 302 which are set to be visible as attribute information and are arranged on each of the arrangement regions 301 on each of the display regions 211, in accordance with a predetermined rule (Step S10).

Subsequently, the display control unit 124 reflects re-calculation results in Steps S6 and S10 to update the positions of the arrangement regions 301 on each of the display regions 211, and update the positions of the display objects 302 on each of the arrangement regions 301 (Step S11). After that, the processing returns to Step S1, and Step S1 and the steps thereafter are repeated.

According to the display control processing executed by the onboard device 10 described above, a size of each of the display regions 211 on the display screen can be changed dynamically in accordance with occurrence of an event exemplified by a touch operation from a user, and display of the display objects 302 displayed on the display region 211 can be dynamically changed in accordance with dynamic change in size of each of the display regions 211. Therefore, screen display excellent in visibility and improved in intuitive operability for a user can be achieved.

Note that the display control processing executed by the onboard device 10, which is described above, can be executed without depending on an aspect ratio or a resolution of the first display 21.

The present invention is applicable not only to the onboard device 10 including the displays (the first display 21 and the second display 22) as in the present embodiment but also to a case where, for example, a screen projected by a projector is controlled. The present invention is not limited to the onboard device 10, but is applicable, for example, to an electronic device used in a relatively small space, such as a cockpit and a passenger seat of an airplane, a ship, and the like.

The effects described in the present specification are merely examples, and are not limited thereto. Other effects may be exerted.

The present invention is not limited to the embodiment described above, and includes various modification examples. For example, each of the embodiments described above is described in detail for the sake of easier understanding of the present invention, and the present invention is not necessarily limited to including all the configurations described herein. It is possible to replace a part of a configuration of one embodiment with a configuration of another embodiment. It is also possible to add a configuration of one embodiment to a configuration of another embodiment. Another configuration can be added to, deleted from, and replaced with a part of a configuration of each embodiment.

A part of or an entirety of the configurations, functions, processing units, processing means, and the like described above may be implemented by hardware by designing those with, for example, integrated circuits or the like. Each of the configurations, functions and the like described above may be implemented by software by a processor that interprets and executes programs for achieving each function. Information for achieving each of the functions, such as a program, a determination table, and a file may be placed in a storage device such as a memory, an HDD, and a solid state disk (SSD), and a recording medium such as an IC card, a secure digital (SD) card, and a DVD. Illustrations of control lines and information lines are those considered to be necessary for the sake of description, and not necessarily include all the control lines and information lines necessary as a product. In actuality, it may be considered that almost all the configurations are connected to each other.

In addition to the display control device and the display control method, the present invention may be provided in various forms such as a computer-readable program.

REFERENCE SIGNS LIST

10: Onboard device
11: Arithmetic processing device
21: First display
22: Second display
23: Storage device
24: Voice input/output device
25: Input device
26: ROM device
27: Vehicle speed sensor
28: Gyro sensor
29: GPS reception device
30: FM multiplex broadcasting reception device
31: Beacon reception device
32: Image capturing device
111: CPU
112: RAM
113: ROM
114: I/F
115: Bus
120: Control unit
121: Input reception unit
122: Operation detection unit
123: Display region setting unit
124: Display control unit
125: Priority setting unit
126: Function processing unit
130: Storage unit
131: Map information
132: Display region information
133: Arrangement region information
134: Display object information
211: Display region
212: Moving display region
241: Microphone
242: Speaker
251: Touch panel
252: Dial switch
301: Arrangement region
302: Display object

The invention claimed is:

1. A display control device connected to a vehicle comprising:
a memory storing programs; and
a processor which, by executing programs, function as:
a display region setting unit configured to change a position of a boundary line of one or a plurality of display regions provided on a screen of the display control device to dynamically change a size of the one or plurality of display regions, in accordance with occurrence of an event;
a display control unit configured to provide arrangement regions for arranging display objects in the one or plurality of display regions, and change a relative positional relationship of the arrangement regions provided on a same display region of the one or plurality of display regions, in accordance with change in size of the one or plurality of display regions; and
a priority setting unit configured to set relative priority with respect to the arrangement regions provided on the same display region, wherein in a case where the relative positional relationship between the arrangement regions provided on the same display region is changed, which causes the arrangement regions to be close to each other at a predetermined distance or shorter, and in response to the change in size of the one or plurality of display regions, the display control unit controls display of the display objects arranged on a same arrangement region in an arrangement region unit by moving or weeding out one or more of the display objects arranged on the arrangement region with lower priority in the arrangement region, and displaying one or more of the display objects arranged on the arrangement region with higher priority, based on the priority set with respect to the arrangement regions, wherein the priority setting unit learns a situation where the priority is changed, and dynamically changes the priority, based on a learning result of a state of information acquired by the vehicle that includes at least a current place, a traveling speed, a traffic condition, a temperature, weather, and a time range.

2. The display control device according to claim 1, wherein in a case where the relative positional relationship between the arrangement regions provided on the same display region is changed, which does not cause the arrangement regions to be close to each other at a predetermined distance or shorter and causes the display objects arranged on the arrangement regions to be close to each other at a predetermined distance or shorter, the display control unit is further configured to collectively weed out one or more of the display objects arranged on the arrangement region with lower priority.

3. The display control device according to claim 1, wherein in a case where the one or plurality of display regions is changed in size to be a predetermined size or smaller, the display control unit is further configured to collectively weed out one or more of the display objects arranged on the arrangement region with lower priority, regardless of the relative positional relationship between the arrangement regions provided on the same display region.

4. The display control device according to claim 1, wherein in a case where the relative positional relationship between the arrangement regions provided on the same display region is changed, which causes the arrangement regions to be close to each other at a predetermined distance or shorter, the display control unit is further configured to collectively weed out one or more of the display objects arranged on the arrangement region with lower priority.

5. The display control device according to claim 1, wherein the display control unit is further configured to change a size of one of the arrangement regions in conformity with change in size of the one or plurality of display regions, and changes arrangement of the display objects on the arrangement region that are changed in size.

6. The display control device according to claim 1, wherein the display control unit is further configured to change a size of one of the arrangement regions in conformity with change in size of the one or plurality of display regions, and changes arrangement of the display objects on the arrangement region that are changed in size without changing a size of the display objects.

7. The display control device according to claim 6, wherein the priority setting unit sets relative priority with respect to the display objects arranged on the same arrangement region, and in a case where arrangement of the display objects on the arrangement region is changed, which causes the display objects on the same arrangement region to be close to each other at a predetermined distance or shorter, the display control unit is further configured to weed out one or more of the display objects with lower priority, based on the priority set with respect to the display objects.

8. The display control device according to claim 1, wherein the display control unit is further configured to change a size of one of the arrangement regions, a size of the display objects arranged on the arrangement region in conformity with change in size of the one or plurality of display regions.

9. The display control device according to claim 1, wherein the priority setting unit is configured to change the priority, based on an input from a user.

10. The display control device according to claim 9, wherein the display control unit is further configured to dynamically change display of the display objects in conformity with dynamic change of the priority.

11. The display control device according to claim 1, wherein each of the arrangement regions includes a directional axis, and the display control unit moves display of the display objects along the directional axis.

12. A display control method performed by a display control device that is connected to a vehicle, the display control method comprising:
  changing a position of a boundary line of one or a plurality of display regions provided on a screen of the display control device to dynamically change a size of the one or plurality of display regions, in accordance with occurrence of an event;
  arranging display objects in the one or plurality of display regions, and changing a relative positional relationship of arrangement regions provided on a same display region of the one or plurality of display regions, in accordance with change in size of the one or plurality of display regions;
  setting relative priority with respect to the arrangement regions provided on the same display region, wherein in a case where the relative positional relationship between the arrangement regions provided on the same display region is changed, which causes the arrangement regions to be close to each other at a predetermined distance or shorter;
  learning a situation where the priority is changed, and dynamically changing the priority, based on a learning result of a state of information acquired by the vehicle that includes at least a current place, a traveling speed, a traffic condition, a temperature, weather, and a time range;
  in response to the change in size of the one or plurality of display regions, controlling display of the display objects arranged on a same arrangement region in an arrangement region unit by moving or weeding out one or more of the display objects arranged on the arrangement region with lower priority in the arrangement region; and
  displaying one or more of the display objects arranged on the arrangement region with higher priority, based on the priority set with respect to the arrangement regions.

* * * * *